(12) United States Patent
Asada et al.

(10) Patent No.: US 6,460,645 B1
(45) Date of Patent: Oct. 8, 2002

(54) VEHICULAR VELOCITY CONTROLLING APPARATUS FOR AUTOMOTIVE VEHICLE

(75) Inventors: Tetsuya Asada, Kanagawa; Tetsuya Iijima; Kenichi Egawa, both of Tokyo; Satoshi Tange, Kanagawa, all of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/598,462

(22) Filed: Jun. 22, 2000

(30) Foreign Application Priority Data

Jun. 23, 1999 (JP) .......................................... 11-176895

(51) Int. Cl.[7] ........................... B60K 31/04; B60K 31/14
(52) U.S. Cl. ........................................ 180/179; 180/174
(58) Field of Search ................................ 180/179, 174

(56) References Cited

U.S. PATENT DOCUMENTS

| | | | | |
|---|---|---|---|---|
| 4,535,865 A | * | 8/1985 | Tanigawa et al. | 180/179 |
| 4,697,478 A | * | 10/1987 | Mastumoto et al. | 180/179 |
| 4,763,746 A | * | 8/1988 | Ochiai | 180/179 |
| 4,931,939 A | * | 6/1990 | Kawata et al. | 180/179 |
| 4,933,859 A | * | 6/1990 | Tsuyama et al. | 180/179 |
| 4,938,604 A | * | 7/1990 | Naito et al. | 180/179 |
| 5,023,792 A | * | 6/1991 | Shioyama | 180/179 |
| 5,121,323 A | * | 6/1992 | Yamamoto et al. | 180/179 |
| 6,052,644 A | * | 4/2000 | Murakami et al. | 180/179 |

FOREIGN PATENT DOCUMENTS

| | | |
|---|---|---|
| DE | 4338098 A1 | 5/1995 |
| EP | 0169693 A2 | 1/1986 |
| EP | 0876936 A1 | 11/1998 |

OTHER PUBLICATIONS

U.S. Serial No. 09/598,468, filed Jun. 22, 2000.

* cited by examiner

Primary Examiner—Paul N. Dickson
Assistant Examiner—Joselynn Y Sliteris
(74) Attorney, Agent, or Firm—McDermott, Will & Emery (57) ABSTRACT

In a vehicular velocity controlling apparatus for an automotive vehicle, a vehicular velocity detector is provided to detect a vehicular velocity of the vehicle, a vehicular velocity controlling section is provided that controls a vehicular driving force of the vehicle to make a detected value of the vehicular velocity substantially equal to a set vehicular velocity previously set, a plurality of switches are provided which includes a first switch (SET/COAST switch) and a second switch (RESUME/ACCELERATE switch), each switch being enabled to be interlocked with a predetermined operation of at least one switching member at a position such as to match with a general vehicular occupant's sense of vehicular manipulation, and a set vehicular velocity modifying section is provided that modifies the set vehicular velocity in such a manner that the detected value of the vehicular velocity is set to the set vehicular velocity when at least one of the following conditions is established, when a time duration of the predetermined operation of the first switch is equal to or longer than a first predetermined time duration and the detected value of the vehicular velocity is lower than the set vehicular velocity and when the time duration of the predetermined operation of the second switch is equal to or longer than a second predetermined time duration and the detected value of the vehicular velocity is higher than the set vehicular velocity.

7 Claims, 7 Drawing Sheets

VEHICULAR VELOCITY CONTROLLING APPARATUS FOR AUTOMOTIVE VEHICLE

BACKGROUND OF THE INVENTION

1. Field of the Invention

The present invention relates generally to a vehicular velocity controlling apparatus for an automotive vehicle to control a vehicular driving force (or vehicular braking force but hereinafter referred to as the vehicular driving force only since the vehicular braking force is merely a negative value of the vehicular driving force) to make a present vehicular velocity of the vehicle substantially equal to a previously set target vehicular velocity (hereinafter, referred to a set vehicular velocity) and more particularly relates to the vehicular velocity controlling apparatus in which a modification technique of the set vehicular velocity is improved.

2. Description of the Related Art

A previous vehicular velocity controlling apparatus has been proposed in which three push button switches are aligned vertically along a peripheral surface of a vehicular steering wheel.

That is to say, a set/coast push button switch (hereinafter, referred to as a SET/COAST switch) is disposed at a lowest position of the three push button switches, a resume/accelerate push button switch (hereinafter, referred to as a RESUME/ACCELERATE switch) is disposed at an uppermost position thereof, and a cancel push button switch (hereinafter, referred to as a CANCEL switch) is disposed at a center position between the SET/COAST switch and the RESUME/ACCELERATE switch.

The SET/COAST switch serves as a switch enabled to set the set vehicular velocity Vset, to start such a vehicular velocity control as described above, and to decrease the set vehicular velocity value Vset. When a main switch of the previously proposed vehicular velocity controlling apparatus is turned on so that the vehicular velocity controlling apparatus falls in a vehicular velocity control wait state, the SET/COAST switch is pushed by a vehicular occupant for a short period of time (hereinafter, called a short-term push operation) so that the present vehicular velocity V is set as the set vehicular velocity Vset to start the vehicular velocity control. In addition, if the short-term push operation is carried out for the SET/COAST switch during the vehicular velocity control, the set vehicular velocity Vset is decreased by a predetermined velocity ΔV (Vset−ΔV). If the SET/COAST switch is continued to be pushed (hereinafter, referred to as a continuous push operation or continuous operation) for a relatively long period of time during the vehicular velocity control, the set vehicular velocity Vset is decreased toward a lower velocity value at a predetermined deceleration.

On the other hand, the RESUME/ACCELERATE switch serves as a switch enabled to resume the vehicular velocity control and to increase the set vehicular velocity Vset toward a higher velocity value. If the short-term push operation is carried out for the RESUME/ACCELERATE switch during the vehicular velocity control, the set vehicular velocity Vset is increased toward the higher velocity value by a predetermined vehicular velocity ΔV (Vset+ΔV). If the continuous push operation is carried out for the RESUME/ACCELERATE switch during the vehicular velocity control, the set vehicular velocity Vset is increased toward the higher velocity value by a predetermined acceleration.

In addition, if the short-term push operation is carried out therefor with the vehicular velocity control released, the vehicular velocity control is resumed to make the vehicular velocity substantially equal to the set vehicular velocity Vset which is prior to the release of the vehicular velocity control.

Furthermore, the CANCEL switch serves as a switch enabled to release the vehicular velocity control.

On the other hand, in addition to the three push button switches described above, another vehicular velocity controlling apparatus has previously been proposed in which lever type switches are attached onto the peripheral surface of the steering wheel. When a lever of the lever type switches is pivoted by the vehicular occupant in a downward direction with respect to a vehicular body, the SET/COAST switch is turned on. When the lever is pivoted by the vehicular occupant in an upward direction with respect to the vehicular body, the RESUME/ACCELERATE switch is turned on.

Suppose that, in each of the previously proposed vehicular velocity controlling apparatuses as described above, the vehicular occupant depresses an accelerator pedal during a vehicular run by means of the vehicular velocity control. In this case, the vehicle is accelerated in response to the depression of the vehicular occupant on the accelerator pedal while the vehicular velocity control is temporarily halted. If the vehicular occupant depresses a brake pedal during the vehicular run by means of the vehicular velocity control, the vehicular velocity control is automatically released even if the CANCEL switch is not operated. It is noted that to RESUME the vehicular velocity control in this state, the RESUME/ACCELERATE switch may be operated.

On the other hand, a previous inter-vehicle distance controlling apparatus has been proposed in which the vehicular velocity is controlled to make an inter-vehicle distance from the vehicle to a preceding vehicle which is running ahead of the vehicle substantially equal to a previously set target inter-vehicle distance (hereinafter, referred to as a set inter-vehicle distance). In the previously proposed inter-vehicle distance controlling apparatus, the above-described vehicular velocity control function is included so that the set vehicular velocity Vset is set in addition to the set inter-vehicle distance. If the preceding vehicle is present in a front detection zone of the vehicle, the vehicular velocity V is controlled to follow up the preceding vehicle. If the preceding vehicle disappears from the front detection zone, the inter-vehicle distance control mode is automatically switched to the vehicular velocity control mode so that the vehicular driving force is controlled to make the vehicular velocity V substantially equal to the set vehicular velocity Vset.

SUMMARY OF THE INVENTION

However, in each of the above-described previously proposed vehicular velocity controlling apparatuses (the previous inter-vehicle distance controlling apparatus is included), when the set vehicular velocity Vset is modified using either one of the SET/COAST switch and RESUME/ACCELERATE switch, the operation of these switches is complex and troublesome, an operability thereof tends to be reduced, and it needs to carry out an operation which does not match with a general vehicular occupant's sense of a vehicular manipulation.

It is, therefore, an object of the present invention to provide a vehicular velocity controlling apparatus for an automotive vehicle in which the modification for the set vehicular velocity Vset provides, without trouble, an operation which matches with the general vehicular occupant's sense of the vehicular manipulation and which has improved the operability.

According to one aspect of the present invention, there is provided a vehicular velocity controlling apparatus for an automotive vehicle, comprising: a vehicular velocity detector to detect a vehicular velocity of the vehicle; a vehicular velocity controlling section that controls a vehicular driving force of the vehicle to make a detected value of the vehicular velocity substantially equal to a set vehicular velocity previously set; a plurality of switches including a first switch and a second switch, each switch being enabled to be interlocked with a predetermined operation of at least one switching member at a position such as to match with a general vehicular occupant's sense of vehicular manipulation, the first switch being operated in response to the predetermined operation of the switching member at a first position such as to match with the general driver's sense of vehicular manipulation to decrease the vehicular velocity, and the second switch being operated in response to the predetermined operation of the switching member at a second position such as to match with the general vehicular occupant's sense of vehicular manipulation to increase the vehicular velocity; and a set vehicular velocity modifying section that modifies the set vehicular velocity in such a manner that the detected value of the vehicular velocity is set to the set vehicular velocity when at least one of the following conditions is established; when a time duration of the predetermined operation of the first switch is equal to or longer than a first predetermined time duration and the detected value of the vehicular velocity is lower than the set vehicular velocity and when the time duration of the predetermined operation of the second switch is equal to or longer than a second predetermined time duration and the detected value of the vehicular velocity is higher than the set vehicular velocity.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Before explaining the present invention, the problems which would occur in each of the previously proposed vehicular velocity controlling apparatuses (referred to hereinafter as the comparative example) will be described with reference to FIGS. 6, 7, 8, and 9.

Figure 6:
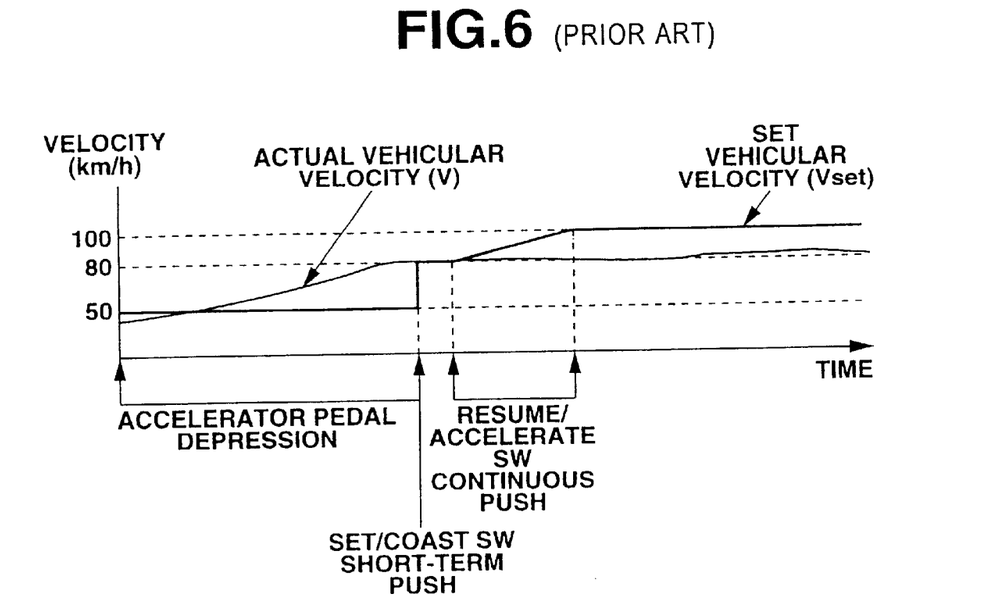
FIG. 6 is an explanatory view for explaining one modification operation of the set vehicular velocity Vset carried out in each of the previously proposed vehicular velocity controlling apparatuses described in the BACKGROUND OF THE INVENTION (hereinafter, referred to as a comparative example) in the case of the first vehicular run situation.

First, suppose that, as shown in FIG. 6, while the vehicle is running to follow up the preceding vehicle with the set vehicular velocity set to 50 Km/h by means of the vehicular velocity control, the vehicular occupant accelerates the vehicle through the depression of the accelerator pedal, the vehicle is, at this time, moved from the same traffic lane as the preceding vehicle to its adjacent overtake traffic lane, and, then, the vehicle is accelerated up to 80 Km/h to catch up with a new preceding vehicle running at the overtake traffic lane so that the set vehicular velocity is increased from 50 Km/h to 100 Km/h. This supposition is hereinafter called a first vehicular run situation.

A modification procedure is such that while the vehicle is accelerated through the accelerator pedal depression and the vehicular velocity is constantly at 80 Km/h to harmonize with a vehicular stream, the short-term push operation for the SET/COAST switch is carried out so that the present vehicular velocity V of 80 Km/h is, once, set as the set vehicular velocity Vset and, hereinafter, the continuous push operation is carried out for the RESUME/ACCELERATE switch so that the set vehicular velocity Vset is increased up to 100 Km/h. It is noted that even if, at this time, the set vehicular velocity Vset is increased, the inter-vehicle distance to the new preceding vehicle is set to be narrower than the set inter-vehicle distance since the vehicle is running to follow up the new preceding vehicle which is running at the same overtake traffic lane as the vehicle through the inter-vehicle distance control.

In order to increase the set vehicular velocity Vset in the case of the first vehicular run situation described above, it is necessary to carry out the short-term push operation for the SET/COAST switch and, thereafter, to carry out the continuous push operation for the other switch of the RESUME/ACCELERATE switch. Hence, the operation of these switches is complex, troublesome, and the operability is reduced. In addition, since it is necessary to once operate the SET/COAST switch placed at the lowest position of the three switches to increase the set vehicular velocity Vset, this modification procedure does not match with the general vehicular occupant's sense of the vehicular manipulation. It is noted that, in the case of the lever type switches, it is also necessary for the vehicular occupant to once pivot the lever in the downward direction to turn on the SET/COAST switch and, thereafter, in turn, to pivot the lever in the upward direction to turn on the RESUME/ACCELERATE switch.

Figure 7:
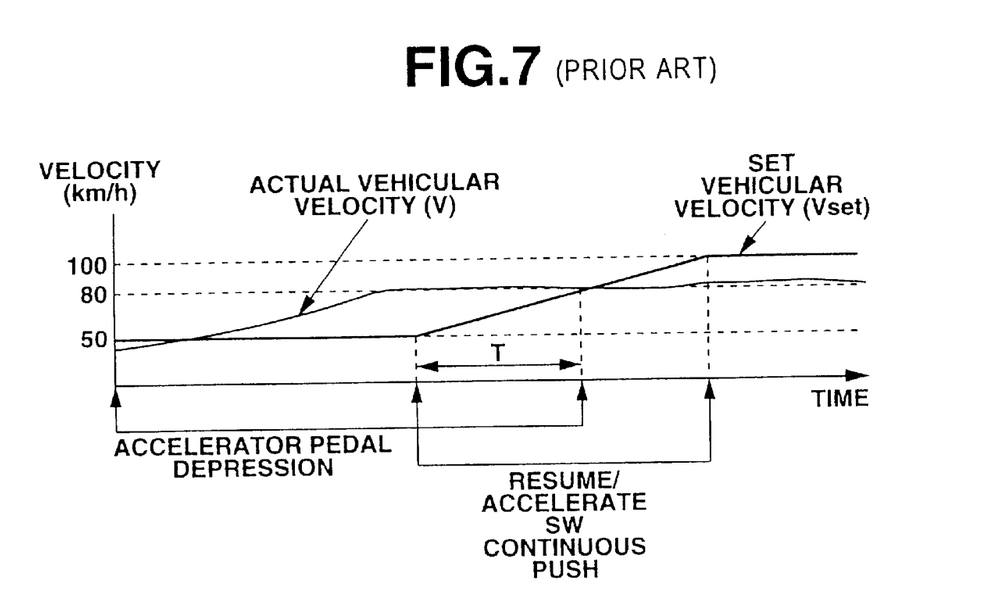
FIG. 7 is an explanatory view for explaining another modification operation of the set vehicular velocity Vset carried out in the comparative example in the case of the first vehicular run situation.

In this case, as shown in FIG. 7, while the vehicular accelerator pedal is used to accelerate the vehicle and the vehicle is running at the vehicular velocity of 80 Km/h to harmonize with the vehicular stream, the continuous push operation is carried out for the RESUME/ACCELERATE switch so that the vehicular velocity is increased from 50 Km/h to 100 Km/h. However, even if the continuous push operation for the RESUME/ACCELERATE switch is carried out, the set vehicular velocity Vset is not increased in a step change manner form from 50 Km/h to the present vehicular velocity of 80 Km/h but the vehicular velocity Vset is increased at the predetermined acceleration from 50 Km/h to 100 Km/h. Hence, the problems of the operation complexity and of the mismatch with the vehicular occupant's sense of the vehicular manipulation do not occur but an operation time duration T for the increase of the set vehicular velocity Vset from 50 Km/h to reach to the actual vehicular velocity of 80 Km/h becomes wasted so that the operation time duration becomes accordingly long.

Figure 8:
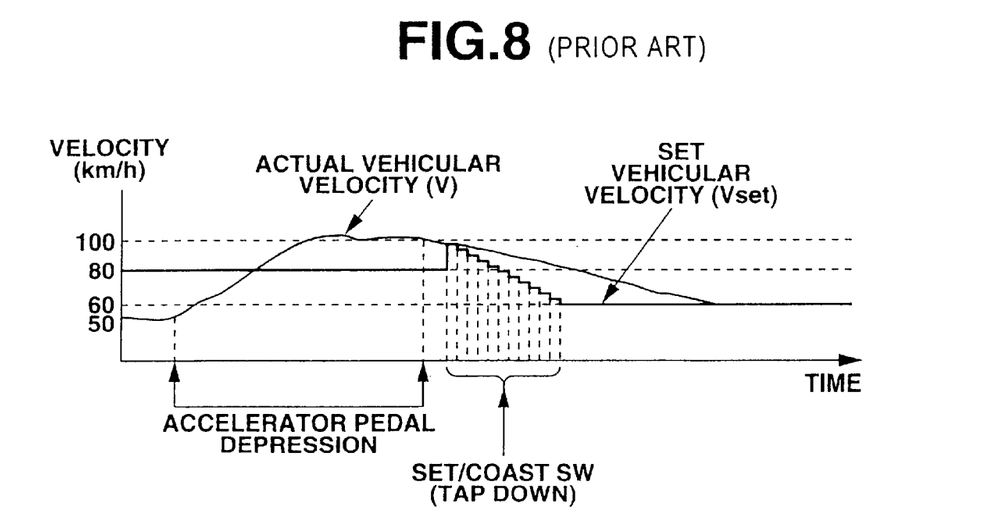
FIG. 8 is an explanatory view for explaining one modification operation of the set vehicular velocity Vset carried out in the comparative example in the case of the second vehicular run situation.

Next, suppose a second vehicular run situation such that, as shown in FIG. 8, while the vehicle is running to follow up the preceding vehicle by means of the inter-vehicle distance control with the set vehicular velocity Vset set at 80 Km/h, the vehicle is accelerated through the accelerator pedal depression to overtake the preceding vehicle which is running at its vehicular velocity of 50 Km/h and, thereafter, the vehicle is returned to the same traffic lane as the preceding vehicle, and the set vehicular velocity Vset is decreased to the set vehicular velocity of 60 Km/h.

This modification procedure of the set vehicular velocity Vset in the second vehicular run situation shown in FIG. 8 is such that when the vehicular velocity is increased to overtake the preceding vehicle through the accelerator pedal depression and, thereafter, the vehicle is returned to the same traffic lane as the preceding vehicle which is now behind the vehicle with the accelerator pedal released, the short-term push operation of the SET/COAST switch is repeated by some number of times (hereinafter, referred to as a tap down operation) so that the set vehicular velocity Vset is lowered from 80 Km/h to 60 Km/h.

However, when the tap down operation is started for the SET/COAST switch to decrease the set vehicular velocity Vset, the set vehicular velocity Vset is once increased and, thereafter, is decreased in accordance with the tap down operation since, at a time point at which the tap down operation is started, the actual vehicular velocity V is higher than the set vehicular velocity of 80 Km/h. In other words, whereas the SET/COAST switch disposed at the lowest position is operated, the set vehicular velocity Vset is once increased so as to give the mismatch with the vehicular occupant's sense of the vehicular manipulation.

Figure 9:
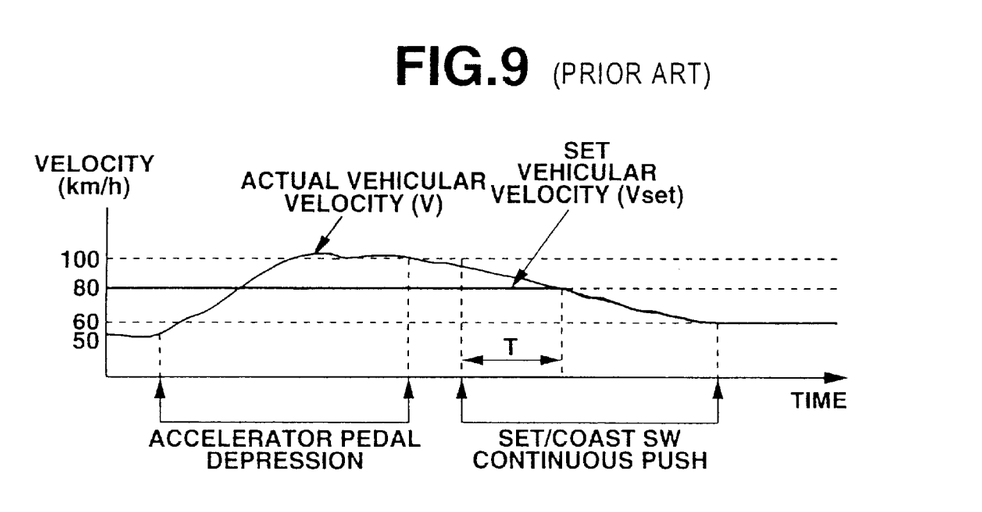
FIG. 9 is an explanatory view for explaining another modification operation of the set vehicular velocity Vset carried out in the comparative example in the case of the second vehicular run situation.

In addition, the continuous push operation for the SET/COAST switch can decrease the set vehicular velocity Vset without the tap down operation therefor. In this case, as shown in FIG. 9, when the vehicle is accelerated through the vehicular occupant's depression of the accelerator pedal in order to overtake the preceding vehicle and, thereafter, is returned to the same traffic lane as the preceding vehicle which is now behind the vehicle with the accelerator pedal released, the SET/COAST switch is started to be operated to decrease the set vehicular velocity Vset from 80 Km/h to 50 Km/h.

However, since the decrease of the set vehicular velocity Vset by means of the continuous push operation for the SET/COAST switch becomes invalid when the actual vehicular velocity V is higher than the set vehicular velocity Vset, the set vehicular velocity Vset is not modified until the actual vehicular velocity V is decreased to the set vehicular velocity of 80 Km/h. A time duration during the decrease of the vehicular velocity V to the previously set vehicular velocity vset of 80 Km/h becomes wasted so that the operation time duration becomes accordingly long.

Figure 1A:
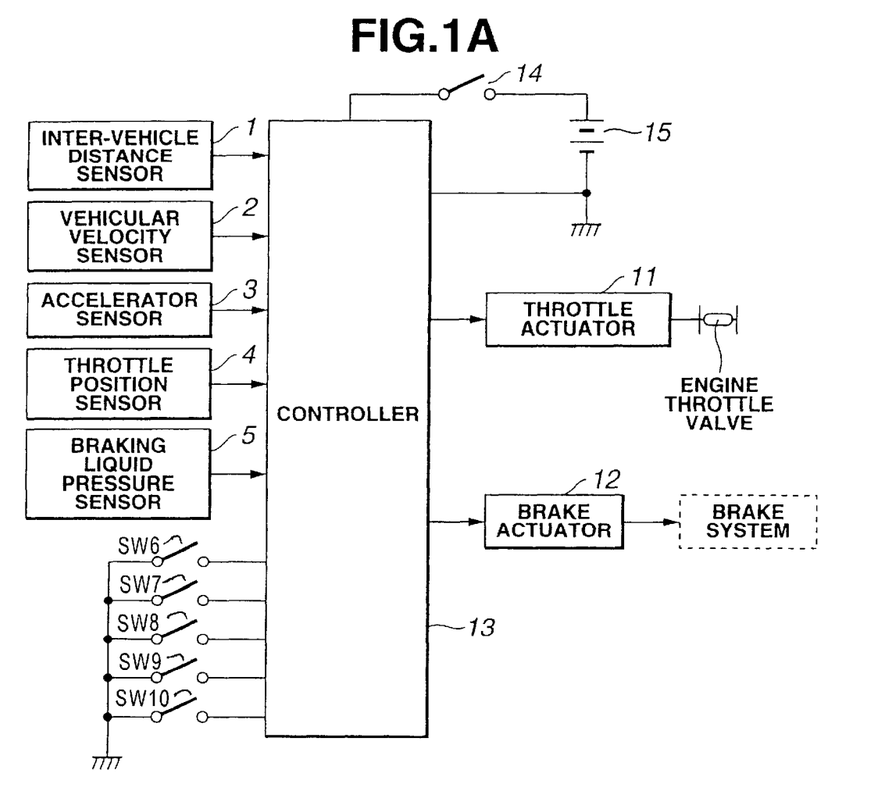
FIG. 1A is a schematic circuit block diagram of a preferred embodiment of a vehicular velocity controlling apparatus.

Next, FIG. 1A shows a circuit block diagram of a vehicular velocity controlling apparatus in a preferred embodiment according to the present invention.

The inter-vehicle distance sensor 1 is constituted by a laser radar unit which sweeps a laser beam in a front width-wise direction and receives a reflected laser beam from an object present in the front width-wise direction, namely, a preceding vehicle which is running ahead of the vehicle so as to measure an inter-vehicle (spatial) distance from the vehicle to the preceding vehicle. It is noted that an ultrasonic wave or electromagnetic wave may be used as a distance measuring media to measure the inter-vehicle distance. The vehicular velocity sensor 2 is attached onto an output axle of a transmission to output a pulse train signal having a period corresponding to its revolution velocity. A period of the pulse train signal or the number of pulses is measured to enable a detection of a vehicular velocity labeled "V". An accelerator sensor 3 detects a depression depth labeled "acc" of an accelerator pedal (not shown). A throttle position sensor 4 detects an opening angle labeled "θ" of an engine throttle valve. A braking liquid pressure sensor 5 detects a braking liquid pressure labeled "Pbrk."

A main switch 6 supplies a power to a controller 13 and other vehicular velocity control pieces of equipment so that an inter-vehicle distance control mode and a vehicular velocity control mode are respectively in a wait state. The brake switch 7 serves as a switch to detect whether a brake pedal has depressed. It is noted that when the brake switch 7 has detected the depression of the brake pedal, the vehicular velocity control module is released in the same manner as the manipulation of the CANCEL switch SW10 (SW10').

The detailed description on the SET/COAST switch SW8 (SW8'), the RESUME/ACCELERATE Switch SW9 (SW9'), the CANCEL switch SW10 (SW10') will be made later.

The throttle actuator 11 includes a vacuum pump, vent valve, and a safety valve and actuates a pump actuator, and a valve solenoid to adjust an opening angle of the throttle valve to control an engine torque, namely, a vehicular driving force. The brake actuator 12 includes a negative pressure type booster so that the braking liquid pressure is adjusted to control the vehicular driving force.

Figure 1B:
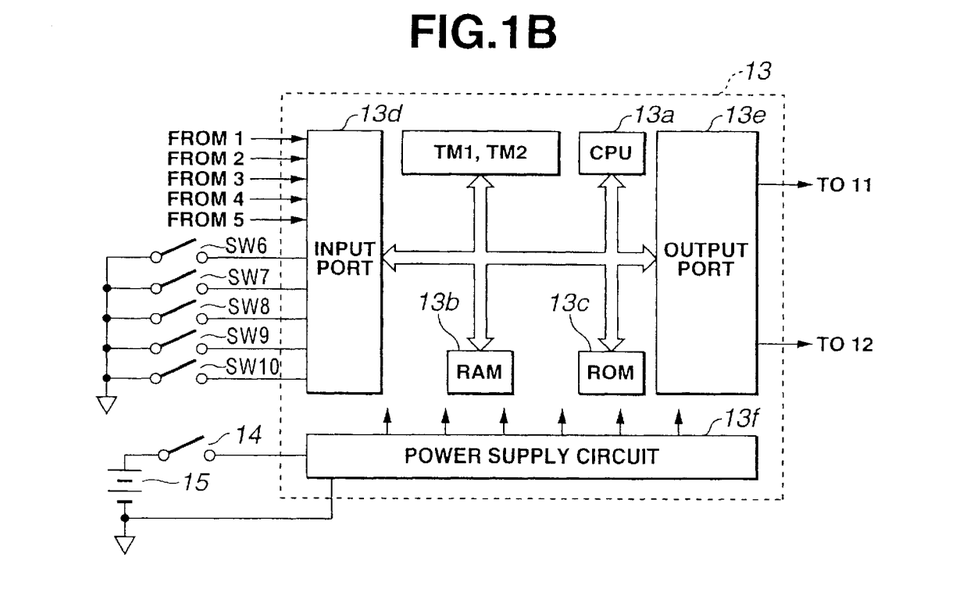
FIG. 1B is a schematic internal circuit block diagram of a vehicular velocity controller shown in FIG. 1A.

The controller 13 includes a microcomputer having a CPU (Central Processing Unit) 13a, a timer interrupt controller having two timers TM1 and TM2, a RAM (Random Access Memory) 13b, a ROM (Read Only Memory) 13c, an Input Port 13d, an Output Port 13e, a common bus, and an internal power supply circuit 13f, as shown in FIG. 1B.

The controller 13 executes a control program routine as will be described later to perform either the inter-vehicle distance control or the vehicular velocity control, and to perform the setting and modification process of the set vehicular velocity Vset. A DC power is supplied from a battery 15 to the sensors 1 through 5, the actuators 11 and 12, and the controller 13 via an ignition switch 14.

Next, the SET/COAST switch SW8 (SW8'), the RESUME/ACCELERATE switch SW9 (SW9'), and the CANCEL switch SW10 (SW10') will be described below.

Figure 10A:
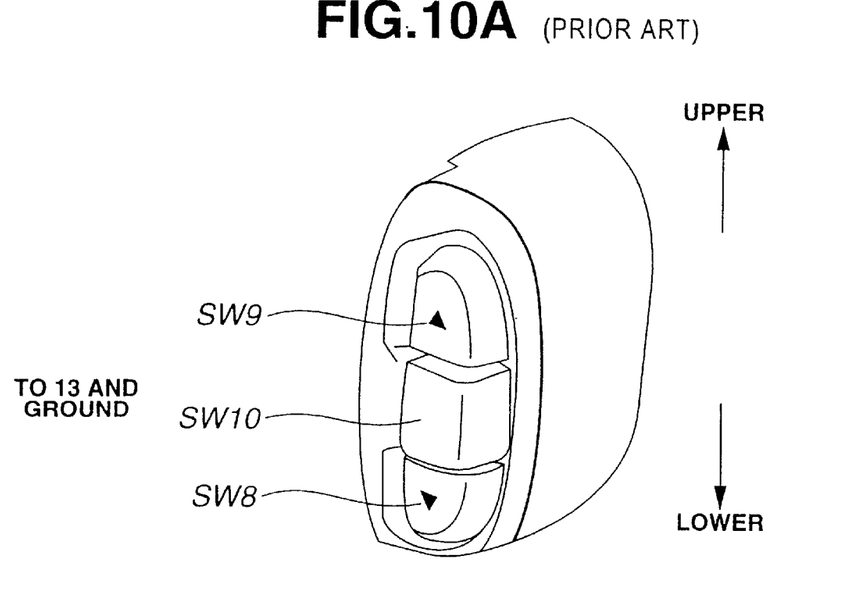
FIG. 10A is a schematic perspective view of three push button switches used in the vehicular velocity controlling apparatus shown in FIG. 1A.
Figure 10B:
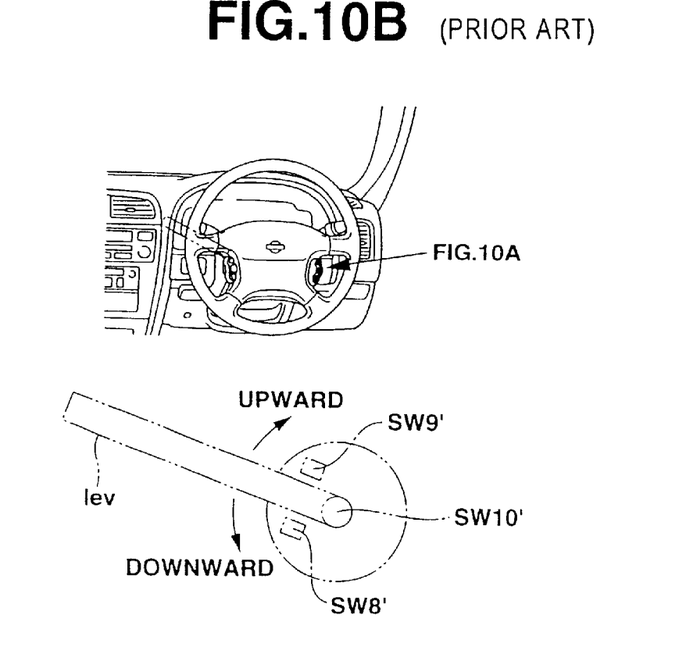
FIG. 10B is a schematic perspective view of the arrangement of the three push button switches on a vehicular steering wheel and of an arrangement of lever type switches on a steering column of the steering wheel as denoted by a phantom line.

In the comparative example of the vehicular velocity controlling apparatus to the embodiment, when the SET/COAST switch SW8 is operated during the execution of the vehicular velocity control procedure, the actual vehicular velocity V is set to the set vehicular velocity Vset irrespective of a magnitude relationship between the actual vehicular velocity V and the set vehicular velocity Vset. The SET/COAST switch SW8 is disposed at the lowest position as shown in FIG. 10A in the case of the push button type switches. The SET/COAST switch SW8' is turned on when the lever lev is pivoted by the vehicular occupant toward the downward direction in the case of the lever type switches as shown in FIG. 10B. In the setting method of the set vehicular velocity Vset during the above-described vehicular velocity control procedure, a case such that the actual vehicular velocity V is lower than the set vehicular velocity Vset means the increase of the set vehicular velocity Vset. Hence, this operation does not contradict with the push operation for the lowest positioned push button switch or the downward operation for the lever switch so that no mismatch to the vehicular occupant's sense of vehicular manipulation occurs. However, in the case where the actual vehicular velocity V is higher than the set vehicular velocity Vset, the set vehicular velocity Vset is, as a result, increased in the upward direction (toward the higher velocity side) so that this case contradicts with the push operation of the lowest positioned switch or the downward operation of the lever switch so as to give the mismatch to the vehicular occupants sense of vehicular manipulation. However, in the case where the actual vehicular velocity V is higher than the set vehicular velocity Vset, the set vehicular velocity Vset is, as a result, increased in the upward Direction (toward the higher velocity side) so that this case contradicts with the push operation for the lowest positioned switch or with the downward direction of the lever. Thus, the mismatch to the vehicular occupant's sense of the vehicular manipulation occurs.

In the embodiment described above, the positional arrangement of the SET/COAST switch SW8, the RESUME/ACCELERATE switch SW9, and the CANCEL switch SW10 remains unchanged as shown in FIG. 10A but a new method of modification of the set vehicular velocity Vset during the vehicular velocity control procedure can be described as follows.

That is to say, if the actual vehicular velocity V is lower than the set vehicular velocity Vset during the vehicular velocity control procedure, a long-term push operation for the lowest positioned SET/COAST switch SW8 causes the actual vehicular velocity V to be set to the set vehicular velocity Vset. If the actual vehicular velocity V is higher than the set vehicular velocity Vset during the vehicular velocity control procedure, the long-term push operation for the uppermost positioned RESUME/ACCELERATE switch SW9 is carried out to set the actual vehicular velocity V to the set vehicular velocity Vset (the lever is pivoted in the upward direction so that the RESUME/ACCELERATE switch SW9' is turned on). Thus, the actual vehicular velocity V is set to the set vehicular velocity Vset.

It is noted that the long-term push operation means such a manipulation that its operation time duration is longer than the short-term push operation but is not continuous push operation which is continued to be pushed. In this embodiment, the operation to push either of the switches for a time duration equal to or longer than, for example, 350 milliseconds is called the long-term push operation and the operation to push either of the switches (the SET/COAST and RESUME/ACCELERATE switches SW8 and SW9) for a time duration shorter than 350 milliseconds is called the short-term push operation. The modification operation for the set vehicular velocity control procedure is that this operation causes the set vehicular velocity Vset to be largely varied.

Hence, the operation time duration is made longer to match with the vehicular occupant's consciousness to remarkably modify the set vehicular velocity Vset.

According to the preferred embodiment, since when the modification of the set value of the set vehicular velocity during the execution of the vehicular velocity control, the set vehicular velocity Vset is decreased when the SET/COAST switch SW8 placed at the lowest position is operated and, on the other hand, is increased when the RESUME/ACCELERATE switch SW9 placed at the uppermost position is operated, the vertical arrangement of the operational switches matches with the increase and decrease of the set vehicular velocity Vset so as to match with the vehicular occupant's sense of vehicular manipulation and no disagreeable feeling is given to the vehicular occupant.

It is noted that, in the case of the lever type switches shown in FIG. 10B, with the lever operated to be pivoted in the downward direction to turn on the SET/COAST switch SW8', the set vehicular velocity Vset is decreased and, on the other hand, with the lever operated to be pivoted in the upward direction to turn on the RESUME/ACCELERATE switch SW9', the set vehicular velocity Vset is increased. Hence, the same advantage as described in the case of the button type switches in the embodiment can be achieved.

Figure 2:
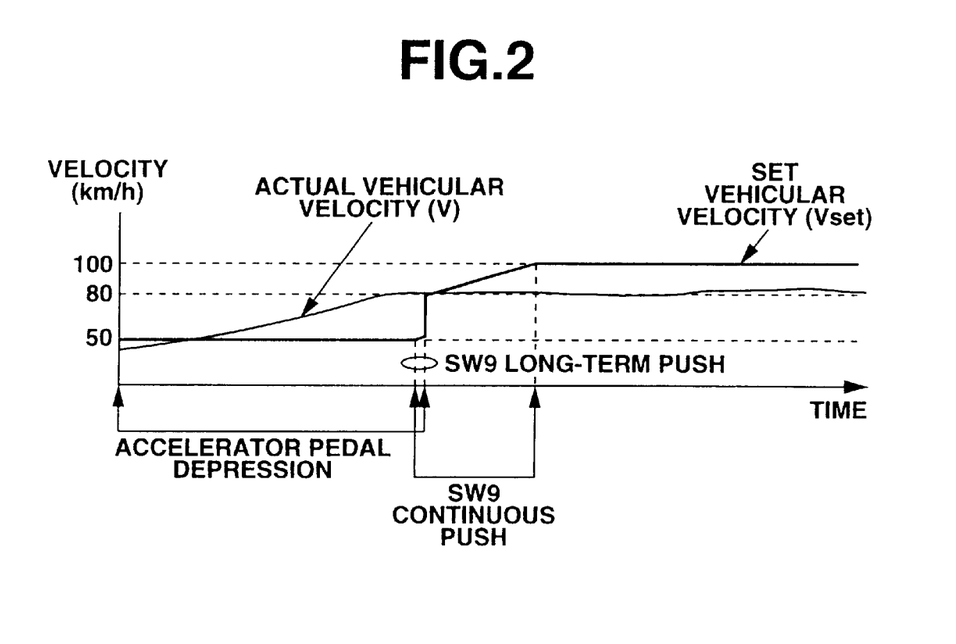
FIG. 2 is an explanatory view for explaining a modification operation of the set vehicular velocity Vset carried out in the preferred embodiment of the vehicular velocity controlling apparatus shown in FIG. 1A in a first vehicular run situation.

FIG. 2 shows procedure and result of the modification of the set vehicular velocity Vset in the case of the embodiment when the first vehicular run situation occurs (for the first vehicular run situation in the case of the comparative example, refer to FIGS. 6 and 7).

Suppose that while the accelerator pedal is depressed and the vehicle is running at the vehicular velocity of 80 Km/h at the same pace as the vehicular stream on the overtake traffic lane, the vehicular occupant operates the RESUME/ACCELERATE switch SW9. At this time, after 350 msec., the present vehicular velocity V of 80 Km/h is again set to the set vehicular velocity Vset. When the RESUME/ACCELERATE switch SW9 is continued to be pushed, the set vehicular velocity Vset is increased at the predetermined acceleration (a predetermined rate of increase in the vehicular velocity with respect to time).

The same result is, naturally, obtained if the long-term operation is carried out for the time duration equal to or longer than 350 milliseconds, thereafter, the RESUME/ACCELERATE switch SW9 is released, and again the continuous push operation is carried out for the RESUME/ACCELERATE switch SW9 is continued to be pushed, the set vehicular velocity Vset is increased at the predetermined acceleration (a predetermined rate of increase in the vehicular velocity with respect to time).

The same result is, naturally, obtained if the long-term push operation is carried out for the time duration equal to or longer than 350 milliseconds, thereafter, the RESUME/ACCELERATE switch SW9 is released, and again the continuous push operation is carried out for the RESUME/

ACCELERATE switch SW9. In either case, since in such a first vehicular run situation that the set vehicular velocity is increased, only the RESUME/ACCELERATE switch SW9 placed at the uppermost position may be operated. Hence, this series of operations match with the vehicular occupant's sense of vehicular manipulation and the operability can be improved.

It is noted that, in the case of the lever type switches, the lever may be operated to be pivoted in the upward direction like the continuous push operation so that the same effect as the case of the push button type switches can be achieved.

Figure 3:
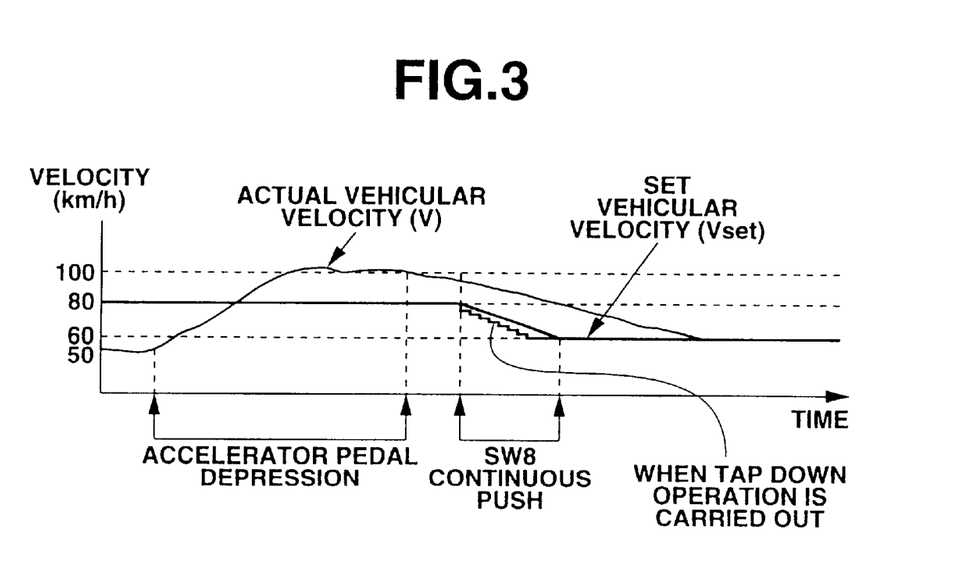
FIG. 3 is an explanatory view for explaining the modification operation of a previously set target vehicular velocity (the set vehicular velocity Vset) carried out in the preferred embodiment of the vehicular velocity controlling apparatus shown in FIG. 1A in a second vehicular run situation.

FIG. 3 shows the procedure and result of the modification of the set vehicular velocity Vset in the case of the embodiment in the second vehicular run situation. For the comparative example in the second vehicular run situation, refer to FIGS. 8 and 9.

Suppose that when the accelerator pedal is depressed to accelerate the vehicle and to overtake the preceding vehicle, thereafter, the vehicle is returned to the original traffic lane, and the accelerator pedal is released. At this time, upon the start of the SET/COAST switch SW8, the set vehicular velocity Vset starts to immediately be decreased. Then, if the SET/COAST switch SW8 is continued to be operated, the set vehicular velocity Vset is decreased at a predetermined deceleration (a predetermined rate of decrease in the vehicular velocity with respect to time). It is noted that the same result is obtained through the tap down operation of the SET/COAST switch SW8.

In such a second vehicular run situation that the set vehicular velocity Vset is lowered (decreased), only the SET/COAST switch SW8 placed at the lowest position may be operated so as to match with the vehicular occupant's sense of vehicular manipulation and the operability can be improved. It is noted that in the case of the lever type switches, the continuous operation for the lever to the lowest position may be carried out. The same result and effect can be achieved.

It is noted that the other functions of both SET/COAST switch SW8 and RESUME/ACCELERATE switch SW9 are the same as those described in the comparative example.

In details, before the vehicular velocity control is started, namely, when the main switch SW6 is turned on so that the vehicular velocity switch is in the wait (standby) state (preparation completed state) and, then, the SET/COAST switch SW8 is operated, the actual vehicular Velocity V is set to the set vehicular velocity Vset to start the vehicular velocity control. In addition, when the continuous push operation for the SET/COAST switch SW8 is carried out during the execution of the vehicular velocity control the set vehicular velocity Vset is decreased at the predetermined deceleration.

Furthermore, in the case where after the vehicular velocity control is released, the short-term push operation is carried out for the RESUME/ACCELERATE switch SW9. At this time, the vehicular velocity control is resumed at the set vehicular velocity Vset which corresponds to the vehicular velocity before the release of the vehicular velocity control.

If the continuous push for the RESUME/ACCELERATE switch SW9 is carried out during the execution of the vehicular velocity control, the set vehicular velocity vset is increased at the predetermined at the predetermined acceleration.

It is noted that the CANCEL switch SW10 serves to release the vehicular velocity control.

Figure 4:
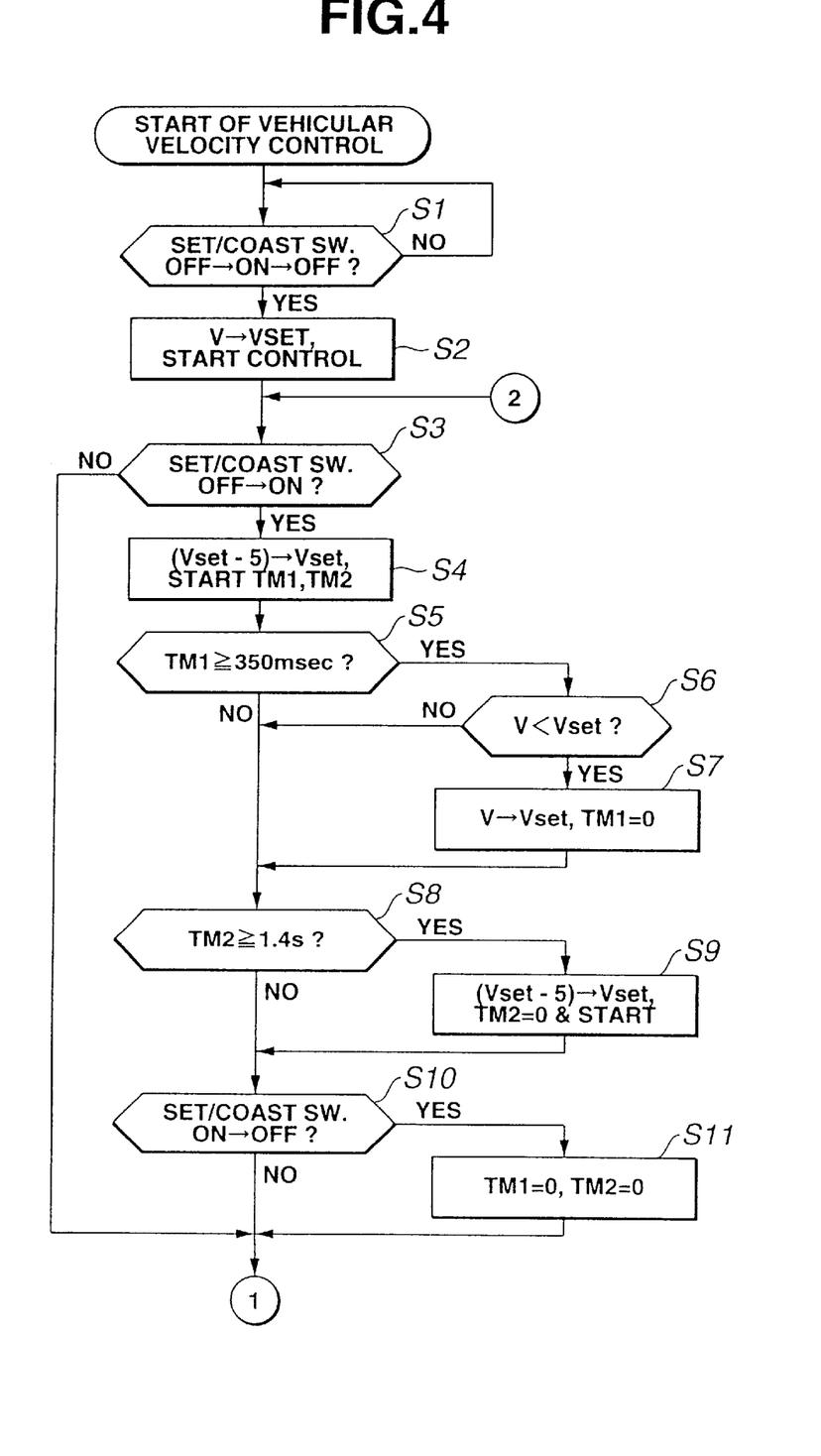
FIGS. 4 and 5 are integrally an operational flowchart representing a vehicular velocity control routine executed by the vehicular velocity controller in the preferred embodiment shown in FIG. 1B.
Figure 5:
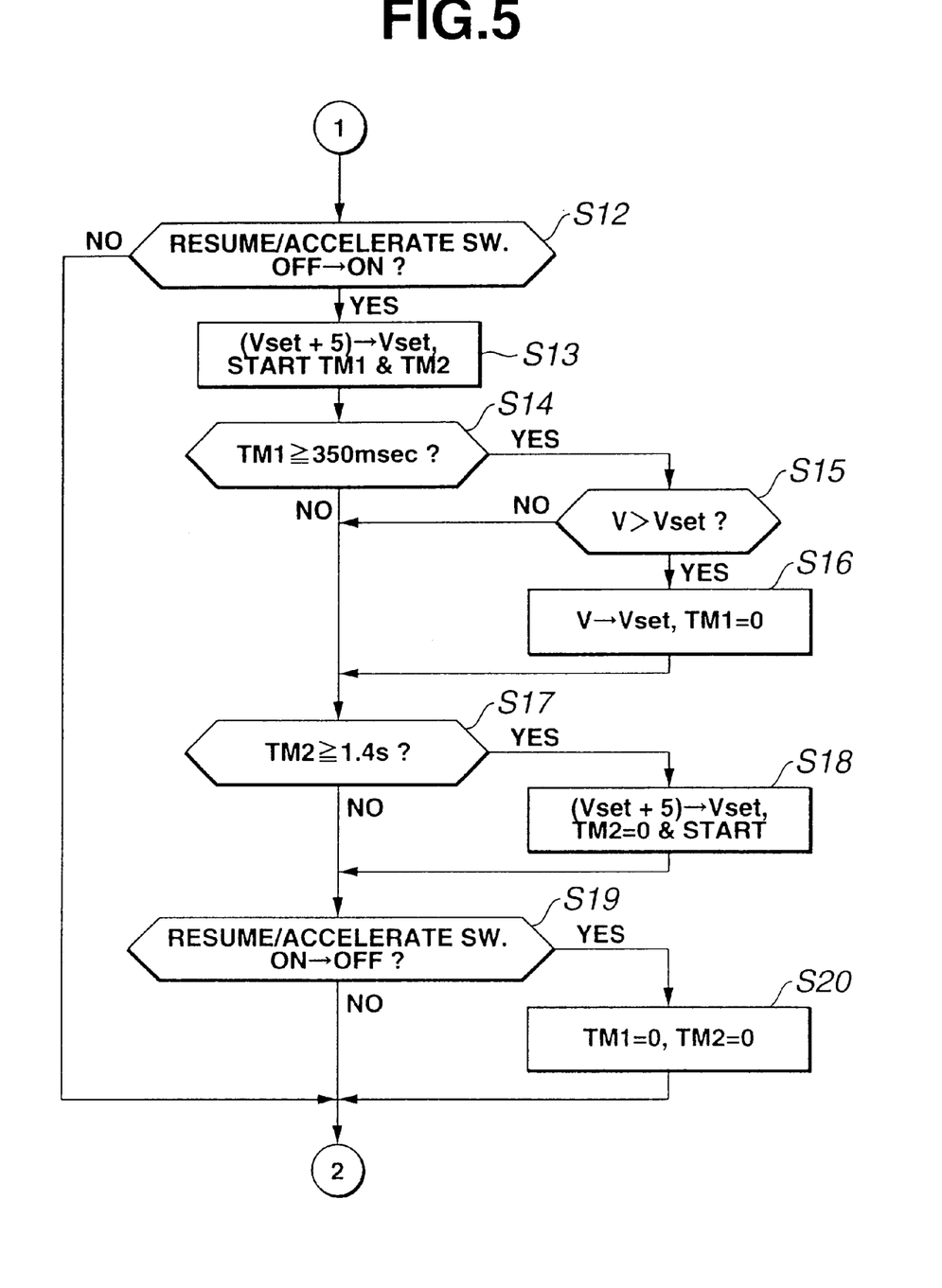

FIGS. 4 and 5 integrally show an operational flowchart representing a vehicular velocity control program routine executed in the vehicular velocity, controlling apparatus of the embodiment.

The flowchart shown in FIGS. 4 and 5 describes an operation of the embodiment.

When the main switch 6 is operated to turn on thereof the program routine shown in FIGS. 4 and 5 is started to be executed.

That is to say, at a step S1, the controller 13, i.e., the CPU 13a of the microcomputer shown in FIG. 1B determines whether the SET/COAST switch SW8 shown in FIG. 10 is operated (the short-term push operation).

If the SET/COAST switch SW8 is operated (Yes) at the step S1, the routine goes to a step S2. At the step S2, the controller 13 sets the present vehicular velocity V to the set vehicular velocity Vset.

At a step S3, the controller 13 confirms the operation for the SET/COAST switch (turn on) SW8. If the SET/COAST switch SW8 is confirmed to be operated (yes) at the step S3, the routine goes to a step S4. If the SET/COAST switch SW8 is confirmed not to be operated (no) at the step S3, the routine goes to a step S12.

At the step S4, the controller 13 decreases the set vehicular velocity Vset by a predetermined velocity $\Delta V$ (Vset−$\Delta V$→Vset, or Vset−MOD (Vset, $\Delta V$)→Vset). It is noted that, in the embodiment, $\Delta V$ (the predetermined velocity) indicates 5 Km/h so that the set vehicular velocity Vset after the set vehicular velocity indicates a multiple of 5 Km/h. For example, when the SET/COAST switch SW8 is operated during the vehicular run of 68 Km/h, the set vehicular velocity of 68 Km/h is once decreased to 65 Km/h which is a multiple of 5 and, thereafter, the set vehicular velocity Vset is decreased to a multiple of 5, i.e., 60 Km/h→55 Km/h→50 Km/h→in this sequence whenever the subsequent short-term push operation for the SET/COAST switch SW8 is carried out. Furthermore, at the step S4, the controller 13 starts first and second timers TM1 and TM2. The first timer TM1 is a timer to measure a time duration of the operation on a determination of the long-term push operation. The second order TM2 is a timer to measure a time duration on the determination of the continuous push operation and to measure a time interval for which the set vehicular velocity Vset is varied while the continuous push operation is carried out.

At a step S5, the CPU 13a of the controller 13 determines whether the first timer TM1 indicates a pass of a predetermined time duration, for example, equal to or longer than 350 milliseconds.

In other words, the controller 13 confirms whether the SET/COAST switch SW8 is operated for a time duration equal to or longer than 350 milliseconds (the long-term push operation is carried out: TM1≧350 msec.).

If Yes at the step S5, the routine goes to a step S6. If No at the step S5, the routine goes to a step S8.

At the step S6, the controller 13 compares the present vehicular velocity V with the set vehicular velocity Vset to determine V<Vset. If V<Vset (Yes) at the step S6, the routine goes to a step S7. If V≧Vset (No) at the step S6, the routine goes to the step S8.

At the step S7, since the long-term push for the SET/COAST switch SW8 is carried out and the present vehicular velocity V is lower than the set vehicular velocity Vset, the present vehicular velocity V is set to the set vehicular velocity (V→Vset). It is noted that, at the step S7, the actual vehicular velocity V is not directly set to the set vehicular velocity but a vehicular velocity value which is near to the actual vehicular velocity V, is a multiple of 5, and is higher than the actual vehicular velocity V. For example, if the actual vehicular velocity V is 57 Km/h, the vehicular velocity value of 60 Km/h which is near to 57 Km/h, is the multiple of 5, and is higher than V=57 Km/h is set to the set vehicular velocity Vset (Vset=60 Km/h). Then, at the step S7, the first timer TM1 is reset and the routine goes to the step S8.

At the step S8, the controller 13 determines whether the second timer TM2 indicates a predetermined time duration or longer, for example, 1.4 seconds or longer. The controller 13 confirms whether the continuous push operation for the SET/COAST switch SW8 is confirmed to be carried out at the step S8 (TM2≧1.4 seconds) so as to determine whether the time duration is taken to decrease the set vehicular velocity Vset.

If the continuous push operation for the SET/COAST switch SW8 is advanced and the time has passed to decrease the set vehicular velocity V, the routine goes to a step S9. If not so (No) at the step S8, the routine skips the step S9. At the step S9, the controller 13 decreases the set vehicular velocity Vset by the predetermined velocity $\Delta V$ (=5 Km/h). At this time, the set vehicular velocity Vset after the decrease of the set target vehicular velocity indicates the multiple of the set vehicular velocity Vset.

For example, suppose that the vehicular velocity V is, initially, 68 Km/h, the continuous push operation for the SET/COAST switch SW8 causes the set vehicular velocity Vset to be decreased in the sequence of 65 Km/h, 60 Km/h, 55 Km/h→ - - - whenever the predetermined time duration of 1.4 seconds has passed. At the step S9, the second timer TM2 is reset to start again.

In the embodiment, when the continuous push operation of the SET/COAST switch SW8 is carried out, the set vehicular velocity Vset is decreased by 5 Km/h for each elapse of 1.4 second.

The predetermined deceleration of the set vehicular velocity Vset indicates approximately 0.06G and becomes substantially equal to a vehicular deceleration which would be developed by a general vehicular occupant.

At a step S10, the controller 13 confirms whether the SET/COAST switch SW8 is confirmed to be turned off (Yes at the step S10), the routine goes to a step S11. If the SET/COAST switch SW8 remains to be turned on (No) at the step S10, the routine goes to the step S12.

At the step S11, the first and second timers TM1 and TM2 are reset as TM1=0 and TM2=0.

Then, the routine goes to a step S12.

At the step S12, the controller 13 confirms if the RESUME/ACCELERATE switch SW9 is in the operation state (turned on). If the RESUME/ACCELERATE switch SW9 is turned on (Yes) at the step S12, the routine goes to a step S13. If NO at the step S12, the routine jumps to the step S3. At the step S13, the set vehicular velocity Vset is increased by the predetermined velocity value of $\Delta V$.

In the embodiment, the predetermined velocity value of $\Delta V$ is set to 5 Km/h in the same manner as the case of the decrease in the set vehicular velocity through the switch SW8 and the set vehicular velocity Vset after the increase in the set vehicular velocity Vset is advanced indicates the multiple of 5 (Km/h). For example, suppose now that, during the vehicular run at 53 Km/h, the RESUME/ACCELERATE switch SW9 is operated, the vehicular velocity V is once increased from 53 Km/h to 55 Km/h which is near to 53 Km/h, and the multiple of 5, and, thereafter, whenever the shortterm push operation for the RESUME/ACCELERATE switch SW9 is carried out, the set vehicular velocity Vset is set to each multiple of 5 in such a sequence as 60 Km/h→65 Km/h→70 Km/h.

It is noted that the predetermined velocity $\Delta V$ is set which may separately be set in the case of the modification of the set vehicular velocity Vset. At the step S13, both of the first and second timers TM1 and TM2 are started.

At the step S14, the controller 13 determines whether the first timer TM1 indicates a predetermined time duration, for example, 300 milliseconds or longer, in other words, the controller 13 determines whether the long-term push operation for the time duration equal to or longer than 350 milliseconds is carried out. If the long-term push operation is carried out (yes) at the step S14, the routine goes to a step S15. If the long-term operation is not carried out (No) at the step S14, the routine goes to a step S17.

At the step S15, the controller 13 compares the present vehicular velocity V with the present set vehicular velocity Vset to determine if V>Vset. If the present vehicular velocity V is higher than the set vehicular velocity Vset (Yes) at the step S15, the routine goes to a step S16 in which V Vset (namely, the present vehicular velocity V is set to the set vehicular velocity Vset), the first timer TM1 is reset to zero and the routine goes to a step S17.

At the step S17, the controller 13 determines if the second timer TM2 indicates a value equal to or longer than a predetermined time duration, for example, 1.4 seconds. In other words, the controller 13 confirms whether the continuous push operation for the RESUME/ACCELERATE switch SW9 is carried out and it has reached to a time of 1.4 seconds to increase the set vehicular velocity Vset.

If the controller 13 determines that TM2≧1.4 seconds (Yes) at the step S17, the routine goes to a step S18. If No (TM2<1.4 seconds at the step S17, the routine skips the step S18 and goes to a step S19.

At the step S18, the controller 13 increases the set vehicular velocity Vset by the predetermined velocity value $\Delta V$ (=5 Km/h). At this time, the increased set vehicular velocity Vset is set to the multiple of 5. For example, suppose that the actual vehicular velocity V is, initially, 53 Km/h. The continuous push operation for the RESUME/ACCELERATE switch SW9 is increased in such a sequence as 55 Km/h→60 Km/h→65 Km/h for each elapse of time of 1.4 seconds.

At the step S18, the controller 13 further executes to reset the second timer TM2 to restart the measurement of the time duration.

It is noted that, in the embodiment, the set vehicular velocity Vset is increased by 5 Km/h for each 1.4 seconds when the continuous push operation for the RESUME/ACCELERATE switch SW9 is carried out, the set vehicular velocity Vset is increased by 5 Km/h for each 1.4 seconds. This acceleration for the set vehicular velocity Vset generally corresponds to 0.06 G which can be approximated to the vehicular acceleration which would be developed by the general vehicular occupant through the accelerator pedal.

Referring back to FIG. 5, at the step S19, the controller 13 determines whether the RESUME/ACCELERATE switch SW9 is turned off from the turn on state.

If turned off (Yes) at the step S19, the routine goes to a step S20. If the switch SW9 remains turned on (No) at the step S19, the routine skips the step S20.

At the step S20, both of the first and second timers TM1 and TM2 are reset to restart its time duration measurement. Thereafter, the routine returns to the step S3.

As described above with reference to FIGS. 4 and 5, the SET/COAST switch SW8 which is placed at the lowest position than the RESUME/ACCELERATE switch SW9 or the SET/COAST switch SW8' is operated when the lever lev is pivoted in the downward direction and the RESUME/ ACCELERATE switch SW9 which is placed at the uppermost position or which is operated when the lever lev is pivoted in the upward direction are installed on the vehicle body as shown in FIGS. 10A and 10B.

Then, the actual vehicular velocity V is set to the set vehicular velocity Vset when the operation time duration for the SET/CAOST switch SW8 (SW8') is equal to or longer than the predetermined time duration (for example, 350 milliseconds) and the actual vehicular velocity V is lower than the set vehicular velocity Vset. On the other hand, the actual vehicular velocity V is set to the set vehicular velocity Vset when the operation time duration for the RESUME/ ACCELERATE switch SW9 (SW9') is equal to or longer than the predetermined time duration (350 milliseconds) and the actual vehicular velocity V is higher than the set vehicular velocity Vset.

In a case where the operation time duration for the SET/COAST switch SW8 is shorter than the predetermined time duration (for example, 350 milliseconds) by the predetermined vehicular velocity value $\Delta V$, the set vehicular velocity Vset is decreased when the operation time duration of the SET/COAST switch SW8 is equal to or longer than the predetermined time duration (for example, 350 milliseconds) and when the actual vehicular velocity V is equal to or longer than the set vehicular velocity Vset.

Furthermore, in a case where the operation time duration for the RESUME/ACCELERATE switch SW9 is shorter than the predetermined time duration (for example, 350 milliseconds), the set vehicular velocity Vset is increased by the predetermined velocity value $\Delta V$ (for example, 5 Km/h as described above). In a case where the operation time duration for the RESUME/ACCELERATE switch SW9 is equal to or longer than the predetermined time duration (for example, 350 milliseconds) and the actual vehicular velocity V is lower than the set vehicular velocity Vset, the set vehicular velocity Vset is increased by the predetermined acceleration (the predetermined rate of increase to time).

Thus, the relative arrangement or operational directions of the SET/COAST switch SW8 (SW8') and the RESUME/ ACCELERATE switch SW9 (SW9') match with the modification direction, namely, the increase or decrease of the set vehicular velocity Vset along with these operations.

Consequently, the modification operation for the set vehicular velocity Vset matches with the general vehicular occupant's sense of the vehicular manipulation and no disagreeable feeling is given to the vehicular occupant.

In addition, the increase or decrease of the set vehicular velocity Vset can be carried out through only one of the two switches, namely, the SET/COAST switch SW8 (SW8') and the RESUME/ACCELERATE switch SW9 and its operability can be improved.

In the embodiment, the vehicular velocity sensor 2 constitutes vehicular velocity detecting means, the SET/COAST switch SW8 (SW8') constitutes a first switch, the RESUME/ ACCELERATE switch SW9 constitutes a second switch, and the controller 13 constitutes vehicular velocity controlling means, and the set vehicular velocity modifying means.

It is noted that although, in the embodiment, a reference time duration to determine each of either the short-term push operation for the first or second switches or the long-term push operation indicates 350 milliseconds, the value of the reference time duration is not limited to 350 milliseconds. It is also noted that although, in the embodiment, the predetermined velocity value $\Delta V$ and the predetermined time duration to determine the acceleration and the deceleration when the continuous push operation for each of the first and second switches indicates 5 Km/h and 1.4 seconds, the predetermined velocity value $\Delta V$ and the predetermined time duration are not limited to these values.

It is noted that a first predetermined velocity $\Delta V1$ in the claims corresponds to the predetermined velocity value $\Delta V$, a second predetermined velocity $\Delta V2$ corresponds to the predetermined velocity value $\Delta V$, but the following case may occur $\Delta V1 \neq \Delta V2$ other than $\Delta V1 = \Delta V2$.

It is also noted that a first time duration $\Delta T1$ in the claims corresponds to the predetermined time duration $\Delta T$ and a second predetermined time duration $\Delta T2$ in the claims corresponds to the predetermined time duration $\Delta T$ but the following case may occur $\Delta T1 \Delta T2$ other than $\Delta T1 = \Delta T2$.

The entire contents of a Japanese Patent Application No. Heisei 11-176895 (filed in Japan on Jun. 23, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular velocity controlling apparatus for an automotive vehicle, comprising:

a vehicular velocity detector to detect a vehicular velocity of the vehicle;

a vehicular velocity controlling section that controls a vehicular driving force of the vehicle to make a detected value of the vehicular velocity substantially equal to a set vehicular velocity previously set;

a plurality of switches including a first switch and a second switch, each switch being enabled to be interlocked with a predetermined operation of at least one switching member thereof, the first switch being operated in response to the predetermined operation of the switching member at a first position to decrease the vehicular velocity, and the second switch being operated in response to the predetermined operation of the switching member at a second position to increase the vehicular velocity; and a set vehicular velocity modifying section that modifies the set vehicular velocity in such a manner that the detected value of the vehicular velocity is set to the set vehicular velocity when at least one of the following conditions are established: when a time duration of the predetermined operation of the first switch is equal to or longer than a first predetermined time duration $\Delta T1$ and the detected value of the vehicular velocity is lower than the set vehicular velocity, and when the time duration of the predetermined operation of the second switch is equal to or longer than a second predetermined time duration $\Delta T2$ and the detected value of the vehicular velocity is higher than the set vehicular velocity.

2. A vehicular velocity controlling apparatus for an automotive vehicle as claimed in claim 1, wherein the set vehicular velocity modifying section includes a set vehicular velocity decreasing section that decreases the set vehicular velocity Vset by a first predetermined velocity $\Delta V1$ when the operation time duration of the first switch is shorter than the first predetermined time duration T1 and by a predetermined deceleration when the time duration of the predetermined operation of the first switch is equal to or longer than the first time duration $\Delta T1$ and the detected value of the vehicular velocity is equal to or higher than the set vehicular velocity.

3. A vehicular velocity controlling apparatus for an automotive vehicle as claimed in claim 1, wherein the set vehicular velocity modifying section includes a set vehicular velocity increasing section that increases the set vehicular velocity Vset by a second predetermined velocity $\Delta V2$ when the operation time duration of the second switch is shorter than the second predetermined time duration $\Delta T2$ and by a predetermined acceleration when the time duration of the second switch is equal to or longer than the second predetermined time duration $\Delta T2$ and the detected value of the vehicular velocity is equal to or higher than the set vehicular velocity Vset.

4. A vehicular velocity controlling apparatus for an automotive vehicle as claimed in claim 1, wherein the first switch comprises a SET/COAST switch and the second switch comprises a RESUME/ACCELERATE switch, each of the SET/COAST switch and the RESUME/ACCELERATE switch having the switching member of a push button, the push button of the SET/COAST switch being arranged in the vehicle at the first position lower than the second position of the RESUME/ACCELERATE switch.

5. A vehicular velocity controlling apparatus for an automotive vehicle as claimed in claim 4, the plurality of switches further includes a CANCEL switch having a push button to be operated to cancel a vehicular velocity control by means of the vehicular velocity controlling section, the CANCEL switch being arranged in the vehicle at a center position between the first and second positions of the SET/COAST and RESUME/ACCELERATE switches.

6. A vehicular velocity controlling apparatus for an automotive vehicle as claimed in claim 5, wherein the SET/COAST, CANCEL, and RESUME/ACCELERATE switches are integrally mounted on a steering wheel of the vehicle in this sequence from the first, center, and the second positions.

7. A vehicular velocity controlling apparatus for an automotive vehicle as claimed in claim 2, wherein the first predetermined time duration $\Delta T1$ has the same value as the second predetermined time duration $\Delta T2$.

* * * * *